Aug. 15, 1967  F. N. DICKERMAN  3,336,005
LATCH MECHANISM

Filed Nov. 17, 1965

INVENTOR.
FRED N. DICKERMAN
BY
George C. Sullivan
Agent

Aug. 15, 1967
F. N. DICKERMAN
3,336,005
LATCH MECHANISM
Filed Nov. 17, 1965
3 Sheets-Sheet 2
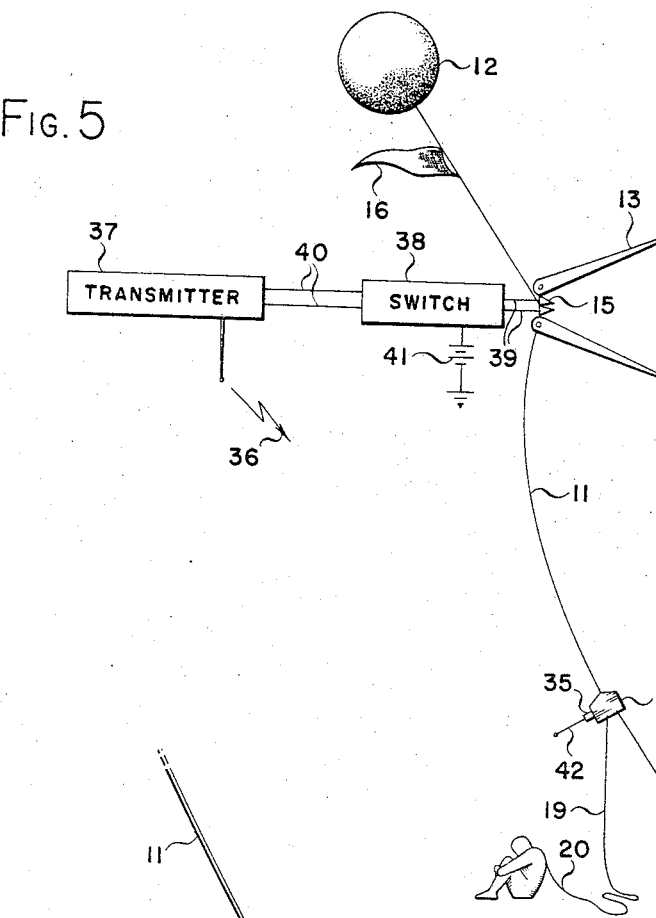
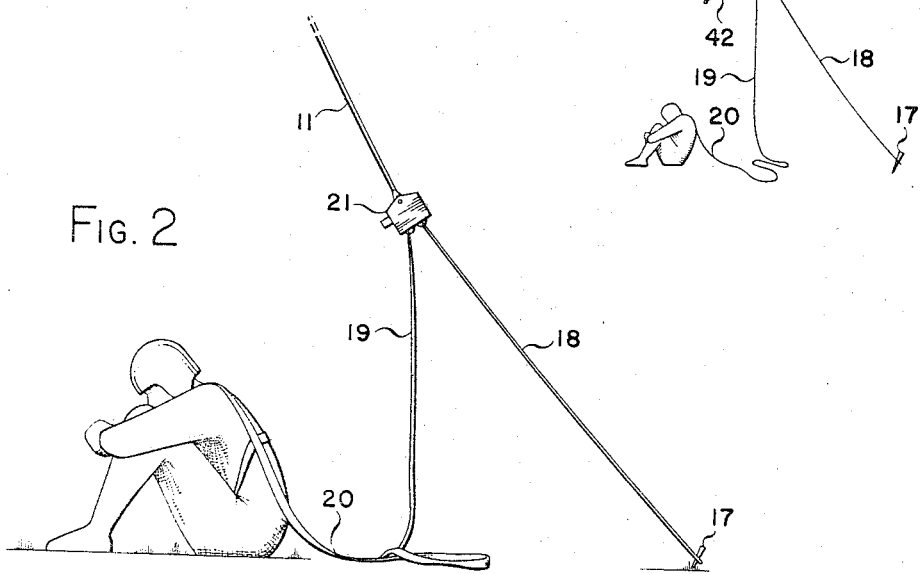
INVENTOR.
FRED N. DICKERMAN
BY
George C. Sullivan
Agent Aug. 15, 1967  F. N. DICKERMAN  3,336,005
LATCH MECHANISM
Filed Nov. 17, 1965

INVENTOR.
FRED N. DICKERMAN
BY
Agent ant">
United States Patent Office 3,336,005
Patented Aug. 15, 1967

3,336,005
LATCH MECHANISM
Fred N. Dickerman, Atlanta, Ga., assignor to Lockheed Aircraft Corporation, Burbank, Calif.
Filed Nov. 17, 1965, Ser. No. 508,304
12 Claims. (Cl. 258—1.2)

ABSTRACT OF THE DISCLOSURE

A latch mechanism has a pair of hooks to secure individual cables. These hooks are spring-biased in opposite directions so that hook #1 tends to engage, while hook #2 tends to disengage, its respective cable. A lock forcibly holds hook #2 in the cable-engaging position, but when the lock is released hook #2 automatically moves to disengage its cable and concurrently engages hook #1 to prevent hook #1 from disengaging its cable even if and when its spring-bias is overpowered.

---

This invention relates to latch mechanisms and more particularly to a latch mechanism having a pair of engaging elements and a lock operable to positively secure one of said elements and adapted when released to disengage that element and concurrently secure the other of said elements in a positive manner.

While the present latch mechanism has general application in the transfer of a positive connection from one engaging element to another, its utility will best be understood by reference to a particular application. For example, in aerial retrieval systems cargo and/or personnel are liberated from a surface area by an aircraft in flight. In such case a buoy in the form of an inflated balloon on the end of the lift line is sent aloft from the surface area. The other end of the lift line is weighted or anchored at the surface with the payload so attracted that all tension in the lift line is applied to the weight or anchor.

When the lift line is snared or grasped by the aircraft, the resulting force or tug of the line eventually overcomes the weight or anchor at which time such force is applied to the payload raising it. It is now desirable to disconnect the weight or anchor. It is also desirable to effect a gradual transfer of the force from the anchor to the payload lest damage or injury to the payload results.

In addition, special precautions must be taken to ensure that the grasp of the line by the aircraft is a proper one and not the result of a miss with the line becoming entangled with aircraft structure. This has heretofore been avoided to a large extent by means of a fending line employed on either side of the line contacting and securing means on the aircraft and extending around the aircraft extremities to guide the lift line if missed away from projecting structure or components of the aircraft. Unfortunately, however, it is not always possible to locate the fending line so that the lift line will not contact any of the components of the aircraft. Thus, the payload can be and has been on occasion connected to and picked up by the aircraft only to be towed thereby and not retrieved into the aircraft.

Moreover, once a proper connection between the aircraft and lift line has been accomplished, the weight or anchor has served its purpose and a clean separation thereof is desirable lest it strike the payload during the retrieval or reel-in operation. This is especially true where the payload happens to be personnel. Usually, this separation is provided for in the form of disconnect means between the weight or anchor and the lift line which is designed to actuate automatically upon the application of a predetermined force produced by a tension wave passing down the lift line when connection to the aircraft is made.

The latch mechanism contemplated by the present invention is applicable to such a retrieval or rescue system constituting a connecting link adapted to be secured to the end of the lift line with dual engaging elements, the first retaining a relatively slack line connected to the payload and the second retaining another relatively taut line connected to the weight or anchor. This mechansim includes a lock initially connecting the second engaging element whereby the weight or anchor is positively connected to the lift line and a release therefor responsive only to the gripping of the lift line by the aircraft securing means. When thus operated to disconnect the weight or anchor, this lock concurrently actuates to connect the first engaging element whereby the payload is positively secured to the lift line. Thus, unless and until the aircraft securing means grips the lift line, the payload is not actually connected to the lift line to effect a pickup whether or not the lift line becomes otherwise connected to the aircraft as by tangling with a component thereof. In this case the payload remains on the surface and the weight or anchor is raised or the line between the lock and the weight or anchor breaks upon application of a predetermined force.

On the other hand, when the lift line is properly gripped by the aircraft securing means, the release actuates the lock to positively disconnect the weight or anchor from the lift line and concurrently positively connect the payload thereto. In this case the weight or anchor remains on the surface and the payload is eventually retrieved within the aircraft in the conventional manner.

With the above and other objects in view as will be apparent, this invention consists in the construction, arrangement and combination of parts all as hereinafter more fully described, claimed and illustrated in the accompanying drawings wherein:

FIGURE 2 is an enlarged view of the ground area illustrated in FIGURE 1 to show generally the application of a latch mechanism in accordance with the teachings of this invention to the lift line for concurrent engagement of the ground anchor and payload lines;

Figure 1:
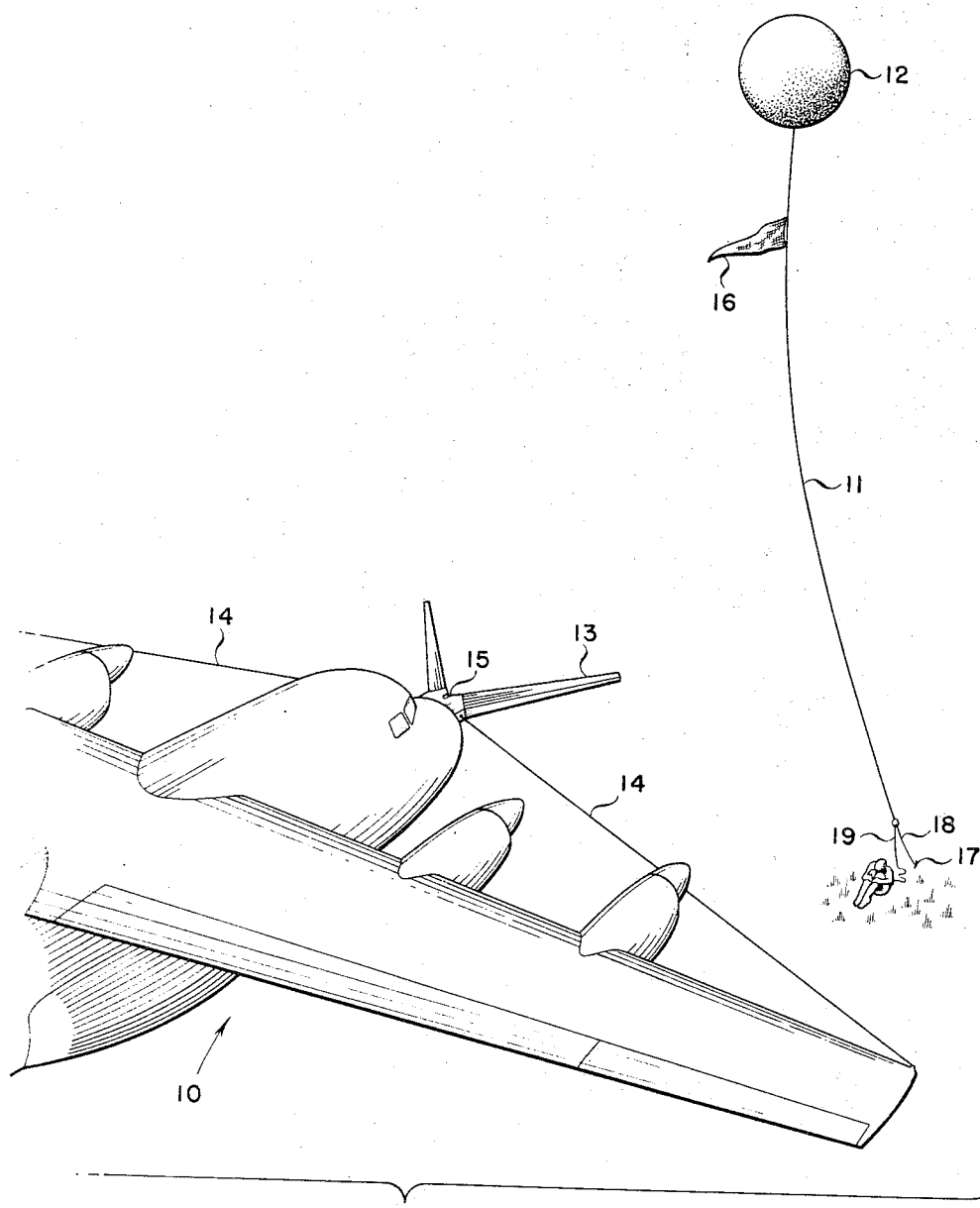
FIGURE 1 is a general schematic view of a typical retrieval operation to show the lift line from a payload, e.g. a person to be rescued from a surface area and anchored to ground with its free end held aloft by an attached balloon and the approaching pickup aircraft prior to contact with the lift line.
Figure 3:
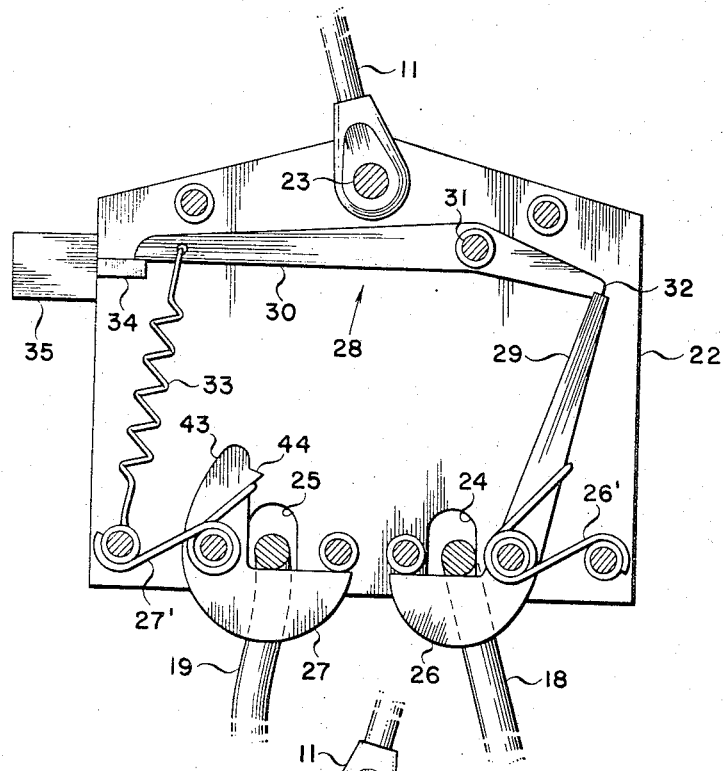
FIGURE 3 is a sectional view taken through the latch mechanism to show the operating parts thereof including the dual engaging elements and the releasable lock therefor in the position corresponding to the conditions of FIGURES 1 and 2.
Figure 4:
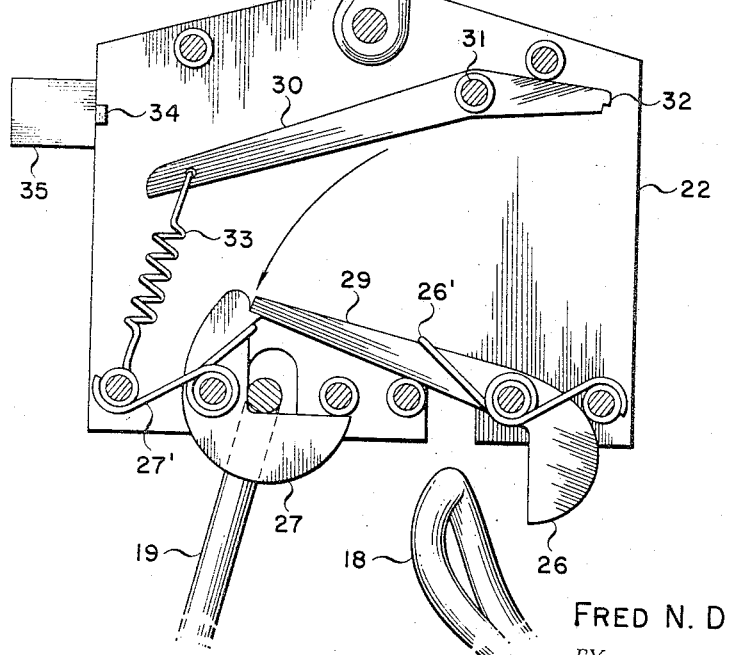

FIGURE 4 is a similar view showing the operating parts of the latch mechanism after operation of the release for actuation of the lock whereby the engaging element associated with the anchor line is positively disconnected therefrom and the engaging element associated with the payload line is concurrently connected thereto in a positive manner; and FIGURE 5 is a schematic view showing primarily the connection between the aircraft securing means and the release of the latch mechanism for the operation thereof whereby a proper engagement of the lift line by the aircraft securing means automatically actuates the lock.

With more particular reference to the drawings, 10 designates a rescue aircraft equipped with a conventional aerial retrieval apparatus designed and adapted to contact and engage a lift cable 11 held aloft by an inflated balloon 12. In essence, this apparatus comprises a fork 13 in the form of a V with its point secured to the nose of the aircraft and its arms projecting in a forward direction. Such a fork is commonly known in the trade as a yoke.

A fending line 14 extends from each wing tip of the aircraft to the nose thereof adjacent the yoke 13 being firmly secured at each end. Within the yoke 13 and mounted on the nose of the aircraft 10 is a cable securing means 15 adapted to receive the cable 11 and upon contact therewith grip it in positive connection whereby it may thereafter be reeled into the aircraft 10. The purpose of the fending line 14 is to guide the cable 11 around the extremities of the aircraft in the event it is not received within the yoke 13 and thereby prevent its entanglement with components of the aircraft 10. Proper receipt of the cable 11 in the yoke 13 is facilitated by one or more flags 16 attached in the length of the cable 11 indicating its location, the relative wind direction, etc.

At its other end the cable 11 is connected to a ground anchor 17 through a relatively taut connecting line 18 and to a relatively slack payload line 19 carrying a harness 20 accommodating, e.g., a person to be rescued. The connection of the ground anchor line 18 and payload line 19 to the cable 11 is effected through a latch mechanism 21 as herein proposed. Such latch mechanism 21 comprises a hollow case 22 pivotally secured as at 23 to the end of the cable 11 at one side and formed or otherwise provided with a pair of spaced notches 24 and 25 at the opposite side. Adjacent each notch is a pivotally connected hook 26 and 27 adapted to rotate to and from positions closing its associated notch, the hook 27 being spring-loaded as at 27' to maintain it in the closed position while the other hook 26 is spring-loaded as at 26' to the open position.

The hook 26 is adapted to receive and connect the free end of the anchor line 18, it being held in the closed position in opposition to its spring-loaded position by a lock 28. To this end the hook 26 is formed or otherwise provided with an arm 29 that projects therefrom and is disposed at all times within the case 22. The lock 28 comprises a lever 30 pivotally mounted as at 31 medially of its length within the case 22 and terminates at one end in a dog member 32 disposed in the plane of the arm 29 on hook 26. At its other end the lever 30 is connected to one end of a tension spring 33 that is secured at its other end to the case 22. Normally, the dog 32 engages the end of arm 29 and holds it in a position to maintain the hook 26 in the closed position with respect to its notch 24 in opposition to its spring 26'. With the dog 32 thus disposed the lever spring 33 is loaded in tension and maintained under such load by a release in the form of a reciprocable core 34 of a solenoid 35 secured in appropriate manner to the side of the case 22.

The solenoid 35 is connected by a radio link 36 to the aircraft 10 which link is established by a transmitter 37 energized by a switch 38. The switch 38 is associated with the securing means 15 and operatively connected thereto through conventional conductors 39 whereby contact of the lift cable 11 with the securing means 15 closes the switch 38. A circuit is thereby established through the conductors 40 from a suitable power source 41 to the transmitter 37 energizing it to send out a coded signal which a pickup 42 operatively associated with the solenoid 35 is adapted to receive. Thus, the solenoid 35 is energized and its core 34 is moved to release the lever 30 under the normal action of its spring 33.

The hook 27 is adapted to receive and connect the outer end of the payload line 19 being held in the closed position with respect to the notch 25 by its spring 27' which is designed and constructed to withstand a predetermined load, for example 100 pounds. The hook 27 carries an arm 43 that projects therefrom internally of the case 22 at all times and terminates in a catch 44 disposed in the plane of the arm 29 of hook 26. When the arm 29 is released by the dog 32 and free to move under the normal action of its spring 26', it is rotated thereby to a position engaging the catch 44.

In view of the foregoing arrangement and construction unless and until the cable 11 is actually caught by the yoke 13 of the aircraft 10 for ultimate engagement by the securing means 15, the payload is not picked up and retrieved by the aircraft 10. If the cable 11 is missed by the yoke 13 and does not become otherwise connected to the aircraft 10, a second pass or try may be made. If, on the other hand, the yoke 13 misses cable 11 but the cable nonetheless becomes connected to the aircraft, as for example by entanglement with a component thereof, the positive connection of the hook 26 to the anchor line 18 by the lock 28 through arm 29 maintains and the ground anchor 17 is eventually uprooted or line 18 breaks under a predetermined force which is greater than that applied by the weight of the payload. The payload however which exceeds the holding capabilities of hook 27 by its spring 27' is disconnected from the cable 11 by the rotation of the hook 27 to its open position.

On the other hand, where the yoke 13 is successful in engaging the cable 11, the cable 11 will contact securing means 15 and be engaged thereby. Upon such engagement, switch 38 will be automatically closed and a circuit established energizing transmitter 37 to actuate the solenoid 35 through radio link 36. The lever 30 is thereby allowed to rotate on its pivot 31 under the normal action of its spring 33, releasing arm 29 of hook 26. The anchor line 18 is thereby disconnected from the hook 26 and the payload line 19 simultaneously connected by its hook 27 upon engagement of the arm 29 in catch 44. The payload is thus connected to the cable 11 and the ground anchor 17 and its line 18 is thereafter left behind when the payload is raised by the cable 11 and eventually reeled into the aircraft 10.

It is to be understood that the foregoing disclosure is directed to a preferred embodiment of the invention. Various modifications are obvious to those skilled in the art and may be effected without departing from the true spirit and scope of the invention which is to be limited solely by the appended claims.

What is claimed is:

1. A latch mechanism comprising a pair of movable elements each having an engaged and a disengaged position, one of said elements being constructed and arranged to move to its disengaged position under predetermined conditions and the other of said elements being constructed and arranged to tend always to remain in its disengaged position; an arm carried by said other element; a lock securing said other element in its engaged position in opposition to its natural tendency; a release for said lock; and a catch carried by said one element and operative to engage said arm upon operation of said release and to secured said one element in said engaged position under the predetermined conditions aforesaid.

2. The latch mechanism of claim 1 wherein each of said elements includes a spring-loaded hook, the hook of said one element being biased in the engaged position and the hook of said other element being biased in the disengaged position.

3. The latch mechanism of claim 1 wherein said other element includes a projection and said lock includes a dog member engaging said projection.

4. The latch mechanism of claim 1 wherein said catch moves with said one element into the path of movement of said other element upon operation of the release as aforesaid whereby said other element in its natural position coacts with said catch to maintain said one element in its engaged position.

5. The latch mechanism of claim 1 including remotely controlled means to operate said release.

6. The latch mechanism of claim 2 wherein said lock includes a spring-loaded dog adapted to engage the hook of said other element in opposition to the spring thereof.

7. The latch mechanism of claim 2 wherein the hook of said other element includes a projecting arm and said lock includes a spring-loaded dog to engage said arm.

8. The latch mechanism of claim 7 wherein said arm terminates in an end disposed in the plane of said catch for coaction therewith when disposed in its natural position.

9. The latch mechanism of claim 5 wherein said remotely controlled means is a solenoid with a reciprocable core.

10. The latch mechanism of claim 1 including a hollow case in which said elements are adapted to be mounted and partially project therefrom.

11. The latch mechanism of claim 2 including a hollow case in which said elements are adapted to be mounted with said hooks projecting therefrom, the side of said case adjacent each of said hooks being formed for coaction therewith to engage an associated member.

12. The latch mechanism of claim 11 in combination with a cable of an aerial retrieval system including a first relatively slack line secured to a payload disposed on a surface area and a second relatively taut line secured to said surface wherein said cable is pivotally secured to said case and the hook of said one element engages said first line and the hook of said other element engages said second line.

References Cited

UNITED STATES PATENTS

| | | | |
|---|---|---|---|
| 1,709,264 | 4/1929 | Holt | 258—1.2 |
| 2,418,702 | 4/1947 | Du Pont | 258—1.2 |
| 2,904,369 | 9/1959 | Campbell | 294—83 |

ROBERT B. REEVES, *Primary Examiner.*

S. H. TOLLBERG, *Assistant Examiner.*